(12) United States Patent
Griffin, III et al.

(10) Patent No.: US 7,363,119 B2
(45) Date of Patent: Apr. 22, 2008

(54) METHODS AND SYSTEMS FOR AUTOMATICALLY DISPLAYING INFORMATION, INCLUDING AIR TRAFFIC CONTROL INSTRUCTIONS

(75) Inventors: John C. Griffin, III, University Place, WA (US); Gordon R. A. Sandell, Bothell, WA (US); Peter D. Gunn, Bellevue, WA (US); Charles A. Pullen, Bellevue, WA (US); John Wiedemann, Bothell, WA (US)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 10/798,588

(22) Filed: Mar. 10, 2004

(65) Prior Publication Data

US 2005/0203675 A1    Sep. 15, 2005

(51) Int. Cl.
   *G01C 23/00* (2006.01)
(52) U.S. Cl. ............... 701/3; 701/4; 701/14; 340/971; 244/175; 345/2.2; 345/1.1
(58) Field of Classification Search ............ 701/3, 701/4, 14; 340/995.14, 995.26, 995.27, 945, 340/971; 244/175, 189; 345/1.1, 2.2
   See application file for complete search history.

(56) References Cited

U.S. PATENT DOCUMENTS

| | | | |
|---|---|---|---|
| 3,191,147 A | 6/1965 | Majendie | |
| 4,196,474 A * | 4/1980 | Buchanan et al. | 701/301 |
| 4,212,064 A | 7/1980 | Forsythe | |
| 4,247,843 A | 1/1981 | Miller | |
| 4,274,096 A * | 6/1981 | Dennison | 342/456 |
| 4,325,123 A | 4/1982 | Graham | |
| 4,471,439 A | 9/1984 | Robbins et al. | |
| H000139 H | 10/1986 | Task | |
| 4,631,678 A | 12/1986 | Angermuller et al. | |
| 4,729,102 A | 3/1988 | Miller, Jr. et al. | |

(Continued)

FOREIGN PATENT DOCUMENTS

DE    3315386 A    10/1984

(Continued)

OTHER PUBLICATIONS

U.S. Appl. No. 10/746,883, filed Dec. 24, 2003, Boorman.

(Continued)

*Primary Examiner*—Brian J. Broadhead
(74) *Attorney, Agent, or Firm*—Perkins Coie LLP

(57) ABSTRACT

Systems and methods for handling incoming aircraft operation instructions are disclosed. A method in accordance with one embodiment of the invention includes receiving from a source off-board an aircraft an instruction for changing a characteristic of the aircraft, and automatically displaying at least a portion of the instruction at a first display location. In response to receiving a first input signal directed by an operator onboard the aircraft, the method can further include displaying at least a target portion of the instruction at a second display location, without the instruction being manually regenerated, and without the instruction becoming part of a flight plan list. In response to receiving a second input signal directed by an operator, the method can further include displaying at least a target portion of the instruction at a third display location, again without the instruction being manually regenerated.

36 Claims, 9 Drawing Sheets

U.S. PATENT DOCUMENTS

| | | | |
|---|---|---|---|
| 4,792,906 | A | 12/1988 | King |
| 4,860,007 | A | 8/1989 | Konicke |
| 4,939,661 | A | 7/1990 | Barker et al. |
| 5,050,081 | A | 9/1991 | Abbott |
| 5,070,458 | A | 12/1991 | Gilmore et al. |
| 5,243,339 | A | 9/1993 | Graham et al. |
| 5,289,185 | A | 2/1994 | Ramier et al. |
| 5,329,277 | A * | 7/1994 | Dougan et al. ............. 340/971 |
| 5,337,982 | A | 8/1994 | Sherry |
| 5,416,705 | A | 5/1995 | Barnett |
| 5,420,582 | A | 5/1995 | Kubbat |
| 5,454,074 | A | 9/1995 | Hartel |
| 5,475,594 | A | 12/1995 | Oder et al. |
| 5,499,025 | A | 3/1996 | Middleton et al. |
| 5,519,392 | A | 5/1996 | Oder et al. |
| 5,523,949 | A | 6/1996 | Agate et al. |
| 5,668,542 | A | 9/1997 | Wright |
| 5,715,163 | A | 2/1998 | Bang |
| 5,739,769 | A | 4/1998 | Vladimir |
| 5,802,492 | A | 9/1998 | DeLorme et al. |
| 5,844,503 | A * | 12/1998 | Riley et al. ................. 340/945 |
| 5,875,998 | A | 3/1999 | Gleine |
| 5,916,297 | A | 6/1999 | Griffin, III et al. |
| 5,940,013 | A | 8/1999 | Vladimir et al. |
| 5,941,930 | A | 8/1999 | Morimoto et al. |
| 5,971,318 | A | 10/1999 | Lustre |
| 5,978,715 | A | 11/1999 | Briffe |
| 5,983,158 | A | 11/1999 | Suzuki et al. |
| 5,995,290 | A | 11/1999 | Noble |
| 5,995,901 | A | 11/1999 | Owen et al. |
| 6,038,498 | A | 3/2000 | Briffe et al. |
| 6,057,786 | A | 5/2000 | Briffe |
| 6,067,502 | A | 5/2000 | Hayashida et al. |
| 6,072,473 | A | 6/2000 | Muller et al. |
| 6,075,467 | A | 6/2000 | Ninagawa et al. |
| 6,085,129 | A | 7/2000 | Schardt |
| 6,098,014 | A | 8/2000 | Kranz |
| 6,112,141 | A | 8/2000 | Briffe |
| 6,118,385 | A | 9/2000 | Leard |
| 6,154,151 | A | 11/2000 | McElreath et al. |
| 6,175,315 | B1 | 1/2001 | Millard et al. |
| 6,188,937 | B1 * | 2/2001 | Sherry et al. ................. 701/14 |
| 6,246,320 | B1 | 6/2001 | Monroe |
| 6,262,720 | B1 | 7/2001 | Jeffrey |
| 6,275,172 | B1 | 8/2001 | Curtis et al. |
| 6,278,913 | B1 | 8/2001 | Jiang |
| 6,313,759 | B1 | 11/2001 | Musland-Sipper |
| 6,314,366 | B1 | 11/2001 | Farmakis et al. |
| 6,335,694 | B1 | 1/2002 | Beksa et al. |
| 6,346,892 | B1 | 2/2002 | DeMers et al. |
| 6,362,750 | B1 | 3/2002 | Castor |
| 6,381,519 | B1 | 4/2002 | Snyder |
| 6,381,538 | B1 | 4/2002 | Robinson et al. |
| 6,389,333 | B1 | 5/2002 | Hansman |
| 6,405,975 | B1 | 6/2002 | Sankrithi et al. |
| 6,424,909 | B2 | 7/2002 | Kusano et al. |
| 6,443,399 | B1 | 9/2002 | Yount et al. |
| 6,449,556 | B1 | 9/2002 | Pauly |
| 6,466,235 | B1 | 10/2002 | Smith et al. |
| 6,473,675 | B2 | 10/2002 | Sample |
| 6,512,521 | B1 | 1/2003 | Barber et al. |
| 6,556,902 | B2 | 4/2003 | Ing |
| 6,636,786 | B2 | 10/2003 | Partel |
| 6,668,215 | B1 | 12/2003 | Lafon et al. |
| 6,690,299 | B1 | 2/2004 | Suiter |
| 6,696,980 | B1 | 2/2004 | Langner et al. |
| 6,697,718 | B2 | 2/2004 | Le Draoullec et al. |
| 6,707,387 | B2 | 3/2004 | Noguchi et al. |
| 6,720,891 | B2 | 4/2004 | Chen et al. |
| 6,745,113 | B2 | 6/2004 | Griffin |
| 6,753,891 | B1 | 6/2004 | Chohan et al. |
| 6,784,869 | B1 | 8/2004 | Clark et al. |
| 6,812,858 | B2 | 11/2004 | Griffin, III |
| 6,856,864 | B1 * | 2/2005 | Gibbs et al. ................... 701/3 |
| 6,870,490 | B2 | 3/2005 | Sherry et al. |
| 6,871,124 | B1 | 3/2005 | McElreath |
| 6,898,492 | B2 | 5/2005 | De Leon |
| 6,909,967 | B2 | 6/2005 | Hirano et al. |
| 6,934,608 | B2 | 8/2005 | Qureshi |
| 6,980,198 | B1 | 12/2005 | Gyde et al. |
| 6,992,596 | B2 | 1/2006 | Cole et al. |
| 6,992,597 | B2 | 1/2006 | Rogers et al. |
| 7,030,892 | B1 | 4/2006 | Gyde et al. |
| 7,103,455 | B2 | 9/2006 | Subelet et al. |
| 7,142,131 | B2 | 11/2006 | Sikora |
| 7,188,007 | B2 | 3/2007 | Boorman et al. |
| 7,256,710 | B2 | 8/2007 | Griffin, III et al. |
| 2002/0004695 | A1 | 1/2002 | Glenn et al. |
| 2002/0016654 | A1 | 2/2002 | Ing et al. |
| 2002/0033837 | A1 | 3/2002 | Munro |
| 2003/0025719 | A1 | 2/2003 | Palmer et al. |
| 2003/0058134 | A1 | 3/2003 | Sherry |
| 2003/0132860 | A1 | 7/2003 | Feyereisen |
| 2003/0225492 | A1 | 12/2003 | Cope et al. |
| 2003/0229426 | A1 | 12/2003 | Griffin |
| 2004/0059474 | A1 | 3/2004 | Boorman |
| 2004/0095466 | A1 | 5/2004 | Galasso |
| 2004/0111192 | A1 | 6/2004 | Naimer et al. |
| 2004/0183697 | A1 | 9/2004 | Rogers et al. |
| 2004/0254691 | A1 * | 12/2004 | Subelet .......................... 701/3 |
| 2005/0178903 | A1 | 8/2005 | Boorman et al. |
| 2005/0182528 | A1 | 8/2005 | Dwyer et al. |
| 2006/0004496 | A1 | 1/2006 | Tucker et al. |
| 2006/0004498 | A1 | 1/2006 | Gunn et al. |
| 2006/0005147 | A1 | 1/2006 | Hammack et al. |
| 2006/0220914 | A1 | 10/2006 | Sikora et al. |

FOREIGN PATENT DOCUMENTS

| | | |
|---|---|---|
| EP | 0 286 120 | 10/1988 |
| EP | 0 370 640 | 5/1990 |
| EP | 0 489 521 | 6/1992 |
| EP | 1273987 | 1/2003 |
| FR | 2817831 | 6/2002 |
| FR | 2848306 | 6/2004 |
| GB | 886136 | 1/1962 |
| WO | WO-02/24530 | 3/2002 |
| WO | WO-04/027732 | 4/2004 |

OTHER PUBLICATIONS

U.S. Appl. No. 10/746,912, filed Dec. 24, 2003, Boorman.
U.S. Appl. No. 10/787,644, filed Feb. 26, 2004, Tafs et al.
U.S. Appl. No. 10/798,749, filed Mar. 10, 2004, Sandell et al.
U.S. Appl. No. 10/814,369, filed Mar. 31, 2004, Chen et al.
U.S. Appl. No. 10/814,494, filed Mar. 31, 2004, Gunn et al.
U.S. Appl. No. 10/815,034, filed Mar. 31, 2004, Crane et al.
777 Flight Deck (1 page); http://www.meriweather.com/777/777_main.html; [Accessed Jan. 28, 2003].
Lindenfeld, Ron, "What is an FMS?", Flight Management Systems (5 pages); http://www.ultranet.com/~marzgold/FAQ-FMS.html; [Accessed Jun. 3, 2002].
Meriweather's Flight Deck Acronyms & Definitions (4 pages); http://www.meriweather.com/fd/def.html; [Accessed Jun. 3, 2002].
Hutchins, Edwin, "The Integrated Mode Management Interface," Department of Cognitive Science, University of California, San Diego, Sep. 17, 1996.
Peugeot 406 Handbook, Automobiles Peugeot, Paris, France, May 14, 1998 (pp. 30 and 38).

Painter et al., "Decision Support For the General Aviation Pilot," Systems, Man, and Cybernetics, IEEE International Conference on Computational Cybernetics and Simulation, Orlando, FL, Oct. 12-15, 1997, pp. 88-93.

International Search Report and Written Opininoo for PCT/US2005/005230, Applicant: The Boeing Company; Date: Feb. 14, 2006, 9 pgs.

NASA, F-18 Cockpit, 1995, <http://www.dfrc.nasa.gov/gallery/Photo/F-18Chase/Medium/EC95-43155-7.jpg>, accessed Aug. 14, 2007.

Deltasoft, F-15 Cockpit, Aug. 2001, <http://web.archive.org/web/20010803031953/http://deltasoft.fife.wa.us/cockpit.htm> accessed Aug. 14, 2007.

* cited by examiner

METHODS AND SYSTEMS FOR AUTOMATICALLY DISPLAYING INFORMATION, INCLUDING AIR TRAFFIC CONTROL INSTRUCTIONS

TECHNICAL FIELD

The present invention relates generally to methods and systems for automatically displaying aircraft information, including air traffic control instructions.

BACKGROUND

Many modern aircraft receive information automatically and electronically from air traffic control (ATC). This arrangement allows air traffic controllers to communicate with the aircraft in an efficient, automated manner. FIG. 1 is a schematic diagram of a typical ATC communication system. An ATC transmitter 60 issues an electronic signal (e.g., via a data link), which is received by an onboard aircraft receiver 61. The aircraft receiver 61 conveys the information to a communication display 10 where the flight crew can read the instructions provided by the air traffic controllers.

Instructions which are to become part of the flight plan for the aircraft are then conveyed automatically to a flight management system where they appear on a flight plan list display 51 presented at a control and display unit (CDU) 50. Other instructions, which do not become part of the overall flight plan for the aircraft follow a different route. These instructions are read by the flight crew (as shown in block 9) and then manually entered by the flight crew into the appropriate aircraft system for example, via a computer keypad. Such instructions can include a directive to change or maintain aircraft altitude, change aircraft heading or speed, tune the aircraft radios to a particular frequency, adjust the aircraft's transponder code, or calibrate the aircraft's altimeter setting. These instructions are manually input at the aircraft's mode control panel 20 (for altitude, heading or speed instructions), or at a radio tuning panel 30 (for radio frequency instructions), or at the aircraft's ATC transponder panel 40 (for transponder code settings), or at the aircraft's altimeter setting panel (for altimeter settings).

One feature of the foregoing arrangement is that the flight crew must manually re-enter a wide variety of data into a computer system after the data are automatically brought aboard the aircraft via the aircraft receiver 61. A drawback with this arrangement is that it can be cumbersome and time-consuming for the flight crew to implement. Accordingly, while the current arrangement provides a method for electronically conveying information to an aircraft, the information may not always be efficiently handled and implemented.

SUMMARY

The present invention is directed generally toward methods and systems for displaying and handling aircraft information, including air traffic control instructions. A method in accordance with one embodiment of the invention includes receiving from a source off-board an aircraft an instruction for changing a characteristic of the aircraft. The method can further include automatically displaying at least a portion of the instruction at a first display location of the aircraft. In response to receiving a first input signal directed by an operator onboard the aircraft, the method can include displaying at least a target portion of the instruction at a second display location, without the instruction being manually regenerated onboard the aircraft and without the instruction becoming part of a flight plan list of automatically executed flight segments. The method can further include, in response to receiving a second input signal directed by an operator onboard the aircraft, displaying at least a target portion of the instruction at a third display location without the instruction being manually regenerated onboard the aircraft. Portions of the instruction can be displayed at different and/or multiple display locations of the aircraft.

In particular embodiments, at least a target portion of the instruction can be displayed at a mode control panel of the aircraft, for example, at a preview display of the mode control panel. In response to receiving the second input signal, the method can include displaying at least a target portion of the instruction at an active display of the mode control panel. The instruction can include an instruction received from air traffic control for directing the aircraft to a target altitude, target air speed, target heading, or an instruction for tuning an aircraft radio to a particular radio frequency setting, adjusting a transponder setting, and/or adjusting an altimeter setting.

A system for handling incoming aircraft operation instructions in accordance with another embodiment of the invention includes means for receiving an instruction for changing a characteristic of an aircraft, from a source off-board the aircraft. The system can further include first display means for automatically displaying at least a portion of the instruction at a first display location of the aircraft (for example, a communication display). The system can further include second display means for displaying at least a target portion of the instruction at a second display location in response to receiving a first input signal directed by an operator onboard the aircraft, without the instruction being manually regenerated onboard the aircraft, and without the instruction becoming part of a flight plan list of automatically executed flight segments. The system can still further include third display means for displaying at least a target portion of the instruction at a third display location in response to receiving a second input signal directed by an operator onboard the aircraft, without the instruction being manually regenerated onboard the aircraft. The second and third display locations can include displays of an aircraft mode control panel.

DETAILED DESCRIPTION

The following disclosure describes systems and methods for displaying, handling and implementing electronic information automatically received aboard an aircraft. Certain specific details are set forth in the following description and in FIGS. 2–10 to provide a thorough understanding of various embodiments of the invention. Well-known structures, systems and methods often associated with handling electronic instructions have not been shown or described in detail below to avoid unnecessarily obscuring the description of the various embodiments of the invention. In addition, those of ordinary skill in the relevant art will understand that additional embodiments of the present invention may be practiced without several of the details described below.

Many embodiments of the invention described below may take the form of computer-executable instructions, such as routines executed by a programmable computer (e.g., a flight guidance computer). Those skilled in the relevant art will appreciate that the invention can be practiced on other computer system configurations as well. The invention can be embodied in a special-purpose computer or data processor that is specifically programmed, configured or constructed to perform one or more of the computer-executable instructions described below. Accordingly, the term "computer" as generally used herein refers to any processor and can include Internet appliances, hand-held devices (including palm-top computers, wearable computers, cellular or mobile phones, multiprocessor systems, processor-based or programmable consumer electronics, network computers, mini-computers and the like).

The invention can also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic or optically readable or removable computer discs, as well as distributed electronically over networks. Data structures and transmissions of data particular to aspects of the invention are also encompassed within the scope of the invention.

Figure 2:
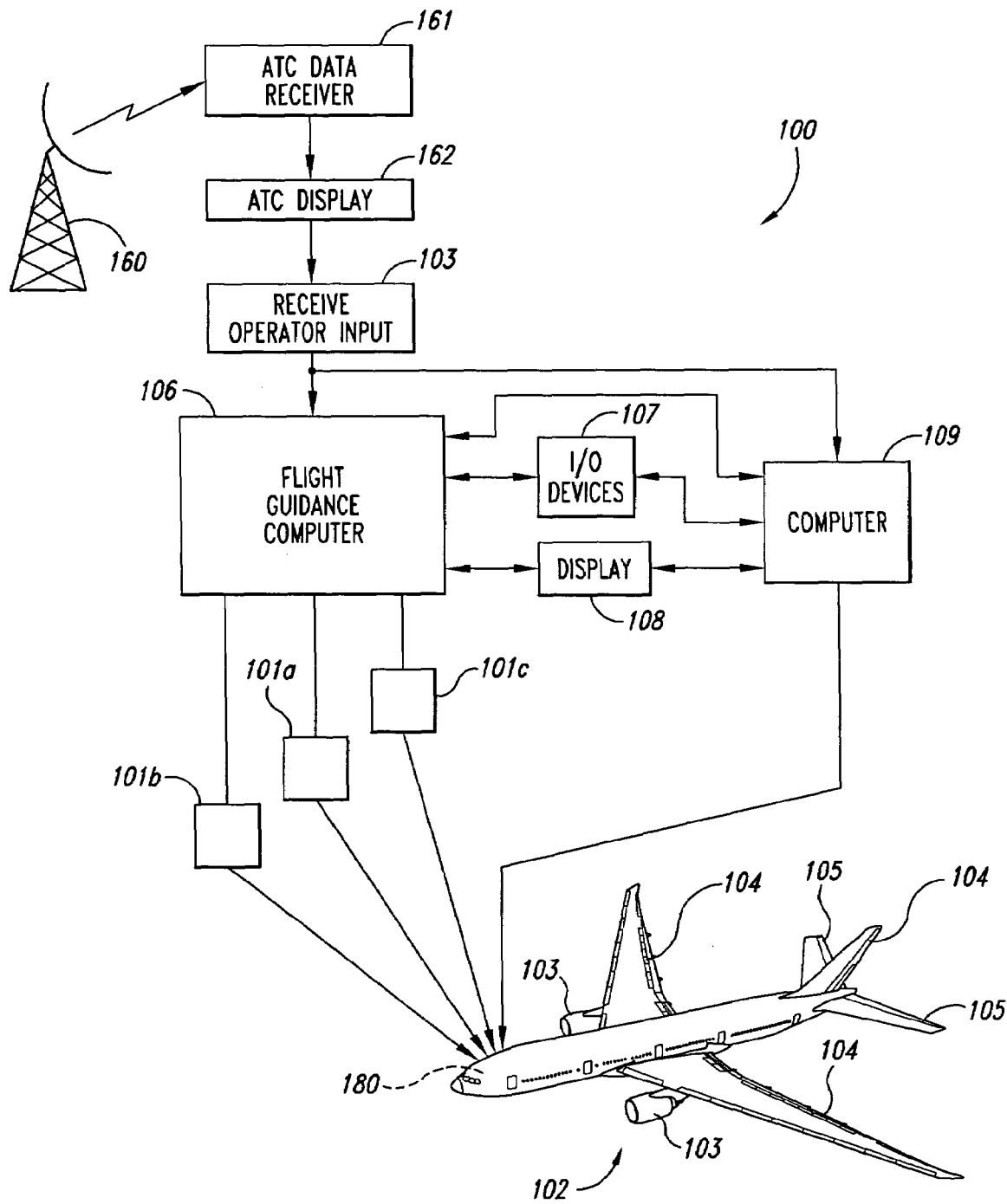
FIG. 2 is a schematic block diagram of a system for conveying information to an aircraft in accordance with an embodiment to the invention.

FIG. 2 is a schematic illustration of an aircraft 102 having a system 100 configured to handle information received from off-board the aircraft in accordance with an embodiment of the invention. In one aspect of this embodiment, the system 100 includes a receiver 161 (e.g., an air traffic control (ATC) data receiver) that automatically receives electronic instructions transmitted to the aircraft 102 from a transmitter 160 (e.g., an ATC transmitter). The instructions are displayed to the flight crew of the aircraft at an ATC display 162. The system 100 receives an input 103 from the operator to load the instructions into a computer, e.g., a flight guidance computer 106 or another computer 109. The instructions are loaded without being manually regenerated onboard the aircraft. Accordingly, and as described in greater detail below, the overall efficiency of the system 100 can be significantly enhanced when compared with existing systems.

The flight guidance computer 106 can include a flight management computer, autoflight computer, autopilot, and/or autothrottle and can be linked to one or more aircraft control systems 101, shown in FIG. 2 as a lateral motion or roll control system 101b, and an air speed or engine control system/autothrottle 101c to control the aircraft direction, altitude and speed. The flight guidance computer 106 directs the operation of the control systems 101 (based on inputs from the receiver 161 and the operator) either automatically or by providing guidance cues to the operator who then manually controls the aircraft 102. Accordingly, the flight guidance computer 106 can include a memory and a processor and can be linked to display devices 108, I/O devices 107 and/or the other computers 109 of the system 100. The other computers 109 can control other (e.g., non-flight control) aspects of the aircraft's operation. The I/O devices 107 and the display devices 108 are housed in a flight deck 180 of the aircraft 102 for access by the pilot or other operator. The operator's interactions with the system 100 are described in greater detail below with reference to FIG. 3.

Figure 3:
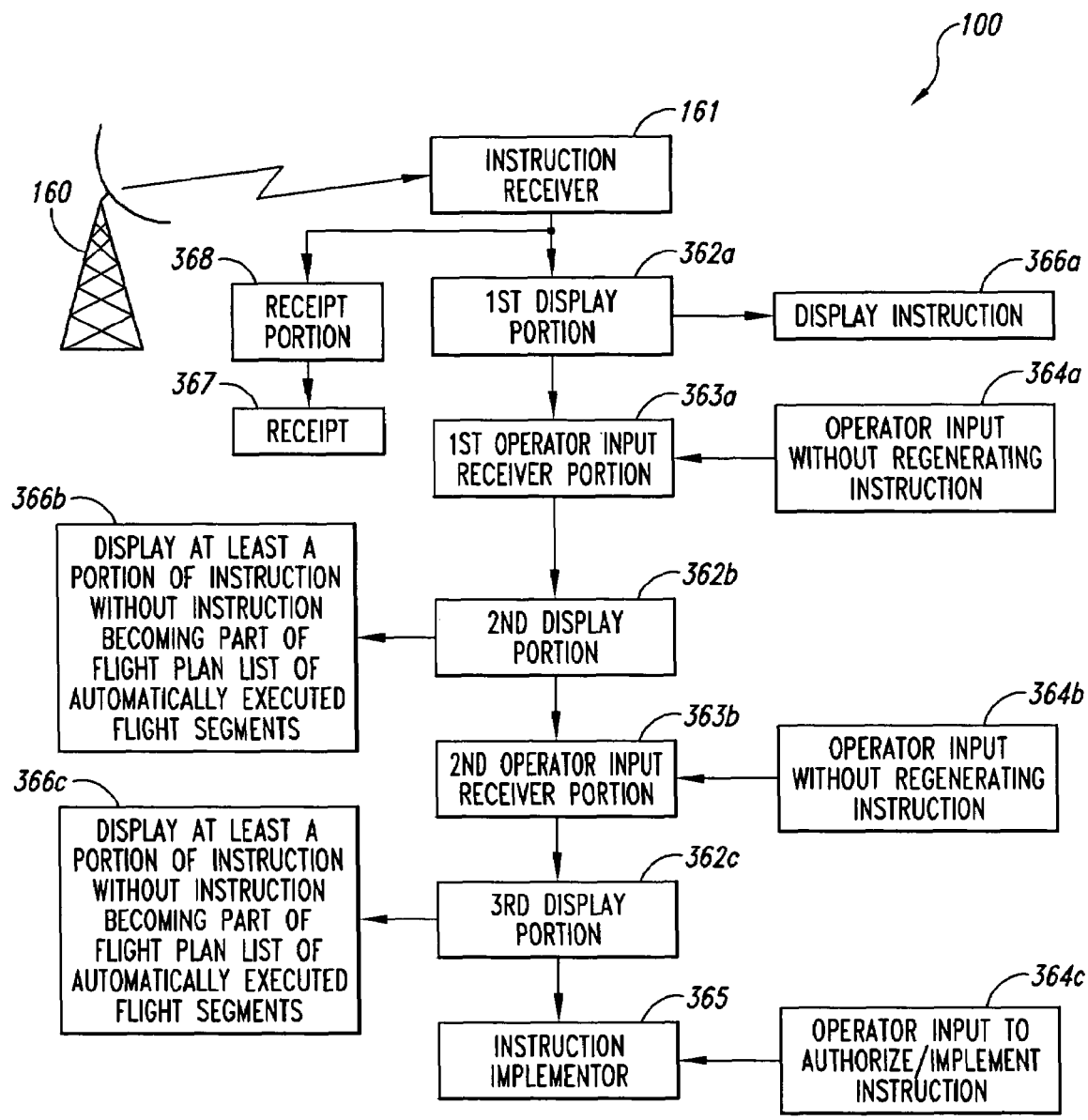
FIG. 3 is a more detailed block diagram illustrating of aspects of the system shown in FIG. 2.

FIG. 3 is a schematic illustration of components of the system 100 configured to process information in accordance with an embodiment of the invention. The instruction receiver 161 onboard the aircraft 102 (FIG. 2) receives information transmitted from the ATC transmitter 160 off-board the aircraft. The information received by the instruction receiver 161 can be in the form of an analog or digital signal. In a particular embodiment, analog signals received by the instruction receiver 161 are converted to digital signals, by the instruction receiver 161 itself or by another portion of the system 100. The system 100 can also provide a receipt 367 of the instruction (e.g., to ATC) via a receipt portion 368. A first display portion 362a displays the instruction to the operator of the aircraft. For example, if the instruction includes a requested change in aircraft course, airspeed, or altitude, the first display portion 362a displays both the nature of the requested change(s) and a numerical target value associated with the change(s) (block 366a).

A first operator input receiver portion 363a then receives an operator input 364a, without requiring the operator to regenerate the instruction. A second display portion 362b re-displays at least a portion of the instruction (block 366b). For example, the second display portion 362b can include a preview display window that allows the operator to preview the target portion of the instruction before the instruction is implemented. The instruction can be displayed without becoming part of a flight plan list of automatically executed flight segments. Accordingly, the instruction can correspond to a tactical instruction, as described below with reference to FIG. 5.

A second operator input receiver portion 363b receives a second operator input 364b, again without requiring the operator to regenerate the instruction. Once the second operator input 364b is received, a third display portion 362c re-displays at least a portion of the instruction (block 366c). For example, the instruction can be displayed at an active window of a display device, indicating to the operator that the instruction is ready to be implemented. An instruction implementer 365 then implements the instruction, either automatically or with a third input 364c from the operator. When the instruction is implemented, a characteristic of the aircraft (e.g., commanded direction, commanded speed, tuned radio frequency, or transponder setting) changes.

Figure 4:
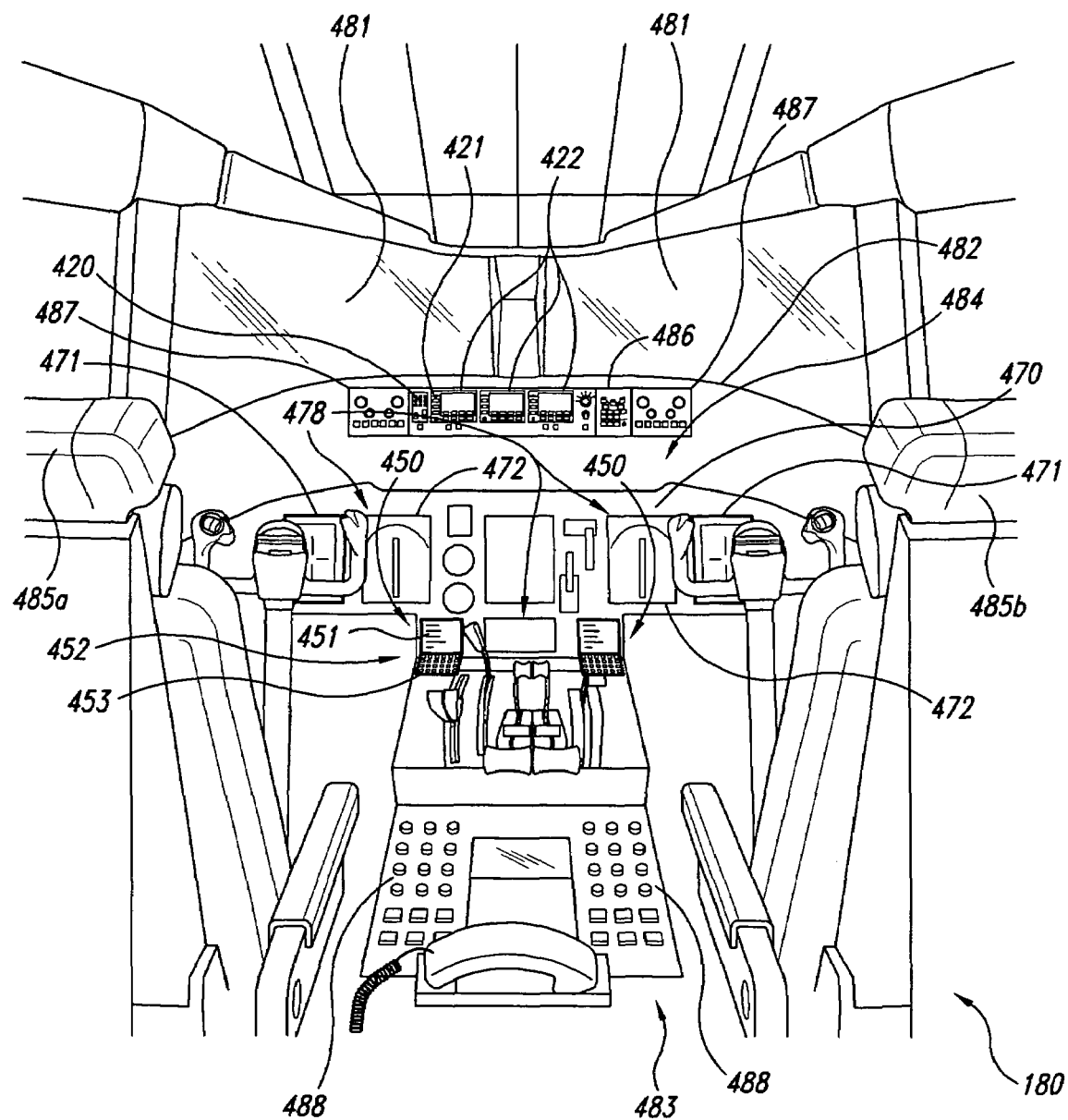
FIG. 4 is a partially schematic illustration of a flight deck having a system that displays and handles information in accordance with an embodiment of the invention.

FIG. 4 illustrates a flight deck 180 having displays and controls associated with an embodiment of the system 100 described above. FIGS. 5–10 are detailed illustrations of portions of the displays and controls, illustrating specific examples of systems and methods for implementing instructions without requiring the operator to regenerate the instructions. Beginning with FIG. 4, the flight deck 180 can include forward windows 481 providing a forward field of view from the aircraft 102 (FIG. 2) for operators seated in a first seat 485a and/or a second seat 485b. In other embodiments, the forward windows 481 can be replaced with one or more external vision screens that include a visual display of the forward field of view out of the aircraft 102. A glare shield 482 can be positioned adjacent to the forward windows 481 to reduce the glare on one or more flight instruments 484 positioned on a control pedestal 483 and a forward instrument panel 470.

Figure 1:
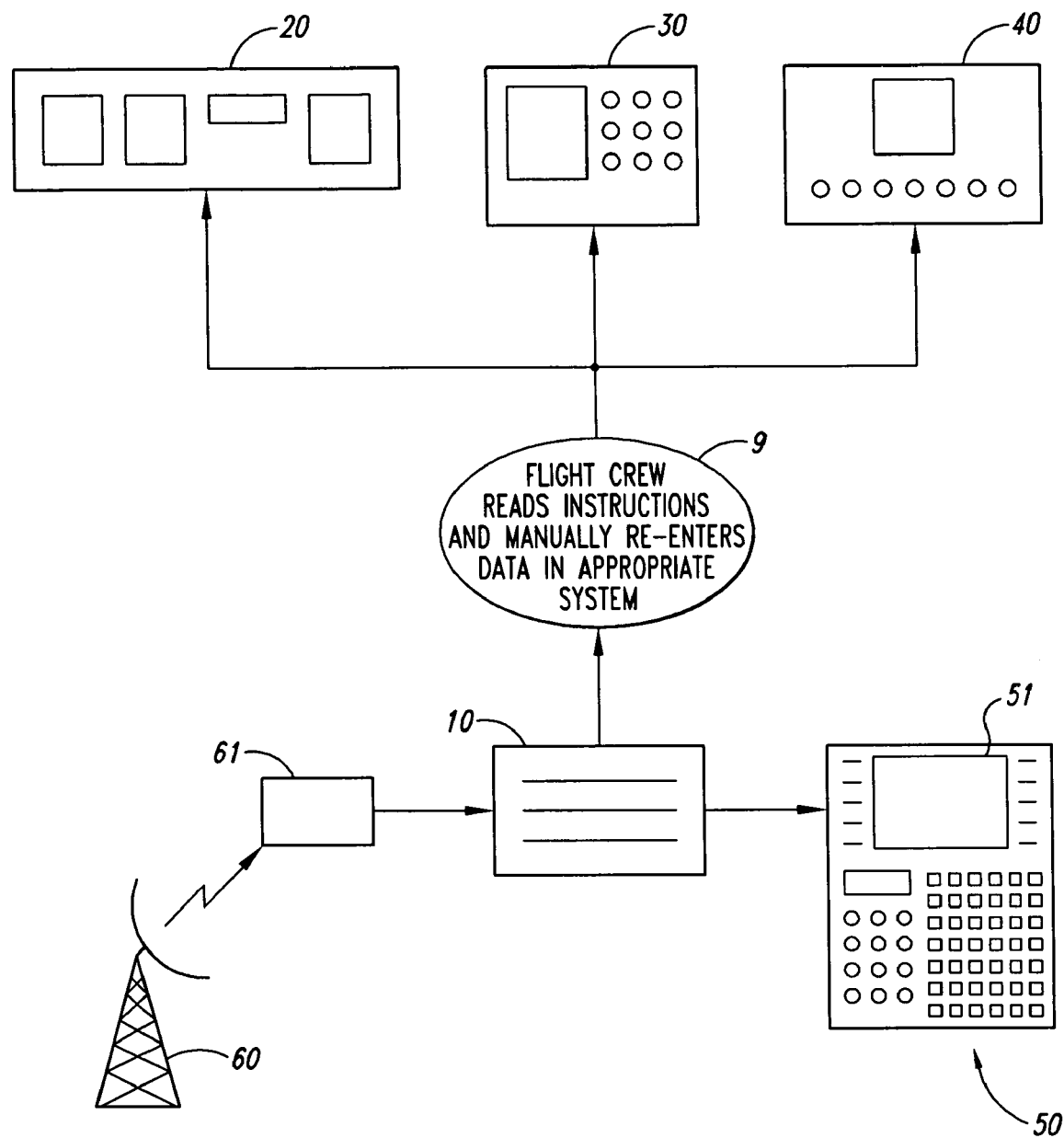
FIG. 1 is a schematic diagram of a system for electronically conveying information to an aircraft in accordance with the prior art.

The flight instruments 484 can include primary flight displays (PFDs) 471 that provide the operators with actual flight parameter information, and multifunction displays (MFDs) 478 that display other operator-selectable information. For example, one or more of the MFDs 478 can present a navigation display 472 containing navigational information. The flight guidance computer 106 described above with reference to FIG. 1 can include several linked and/or unlinked computers, including a flight management computer (FMC) 452. Control display units (CDUs) 450 positioned on the control pedestal 483 provide an interface to the flight management computer 452. The CDUs 450 include a flight plan list display 451 for displaying information corresponding to upcoming segments of the aircraft flight plan. The flight plan list can also be displayed at one of the MFDs 478 in addition to or in lieu of being displayed at the CDUs 450. The CDUs 450 also include input devices 453 (e.g., alphanumeric keys) that allow the operators to enter information corresponding to the segments. The flight guidance computer 106 can further include a mode control panel (MCP) 420 having input devices 421 for receiving inputs from the operators, and a plurality of displays 422 for providing flight control information to the operators. The operators can select the type of information displayed on at least some of the displays by manipulating a display select panel 486. Electronic flight information system control panels (EFISCPs) 487 include displays and input devices for altimeter settings. Radio control panels 488 provide displays and controls for setting radio frequencies.

Figure 5:
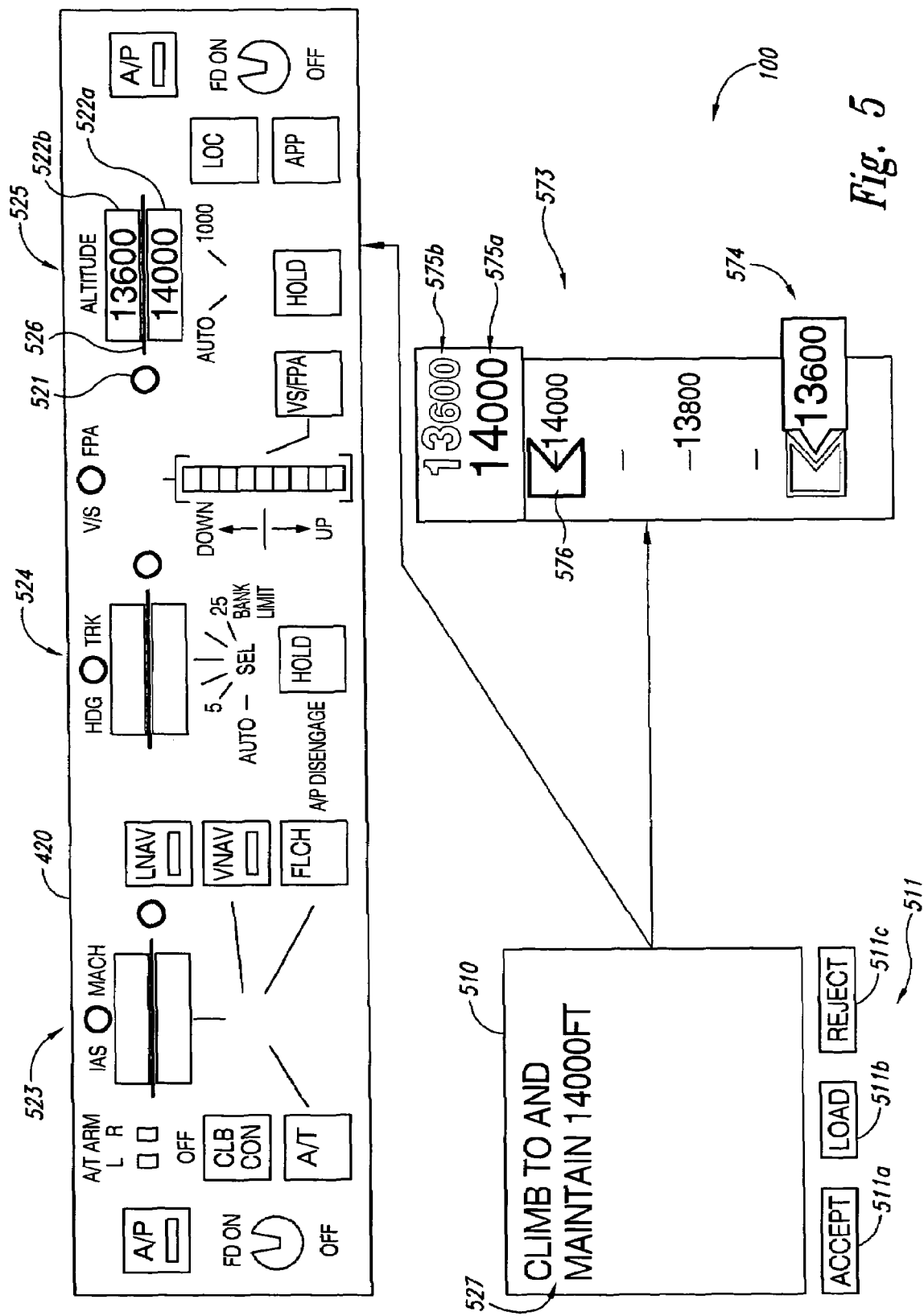
FIG. 5 is an illustration of portions of a system for handling aircraft altitude control information in accordance with an embodiment of the invention.
Figure 6:
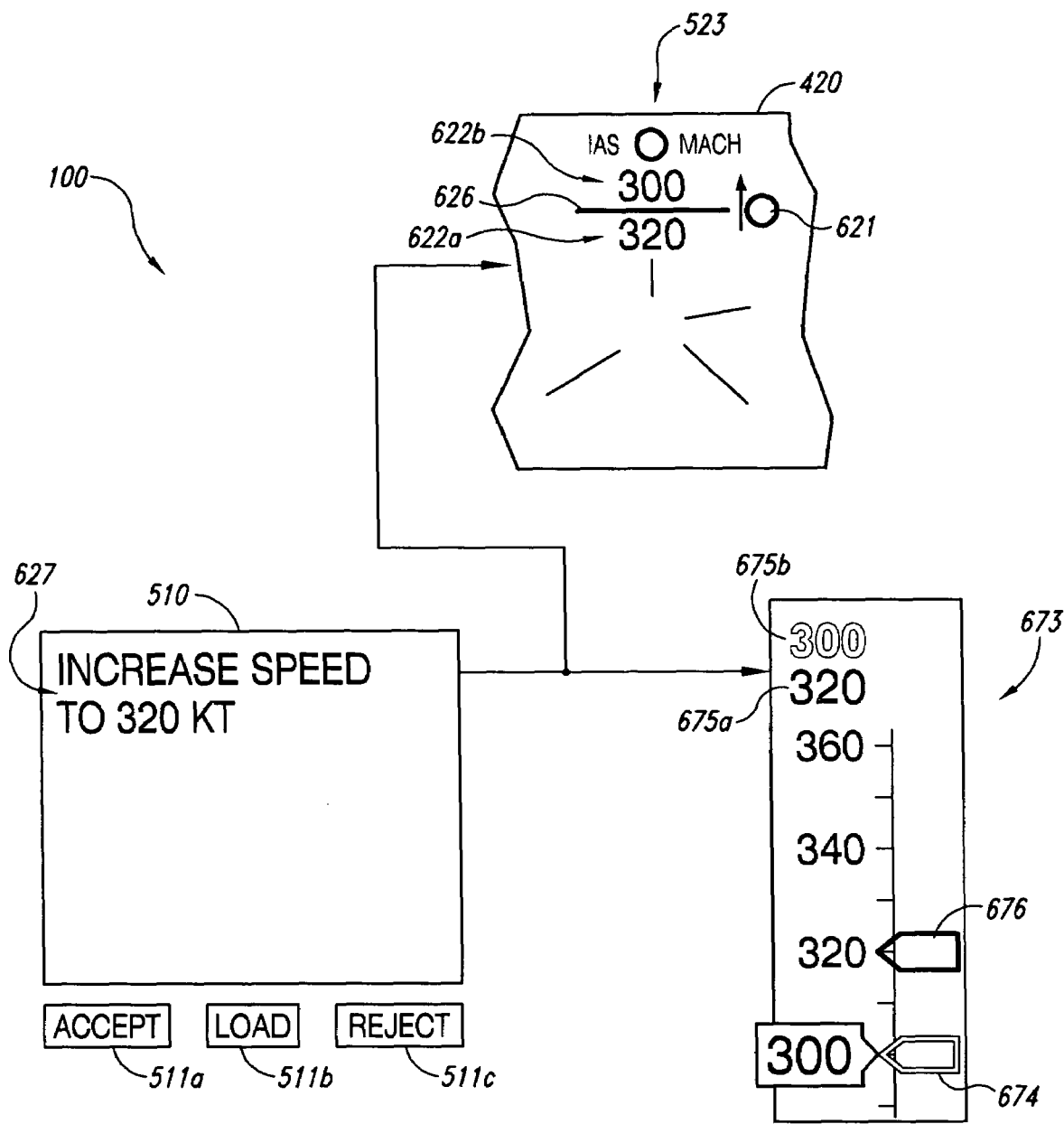
FIG. 6 is an illustration of portions of a system for handling aircraft speed information in accordance with an embodiment of the invention.

FIG. 5 illustrates the mode control panel 420, together with a communication display 510 and an altitude display 573 configured in accordance with an embodiment of the invention. The mode control panel 420 includes a speed control portion 523 for controlling aircraft speed, a lateral control portion 524 for controlling the lateral motion of the aircraft, and a vertical control portion 525 for controlling the vertical motion and altitude of the aircraft. Each portion can include a preview display, an active display, a visual separator, and an input device. For example, the vertical control portion 525, which is highlighted in FIG. 5, can include a preview display 522a separated from an active display 522b by a separator 526. The preview display 522a can present a target (corresponding to a new instruction) for review by the operator before the operator further loads or transfers the instruction for implementation, for example, with a transfer input device 521.

An instruction 527 can be initially presented at the communication display 510. The communication display 510 can be a field of one of the MFDs 478 (FIG. 4), the CDU 450 (FIG. 4), or another display. Input devices 511 (shown as an "accept" input device 511a, a "load" input device 511b and a "reject" input device 511c) positioned proximate to the communication display 510 allow the operator to accept, reject or load the instruction displayed at there. The selectors 511 can have other labels in other embodiments, e.g., the "accept" input device 511a can be labeled "wilco" or "roger" and/or the "reject" input device 511c can be labeled "unable." In one embodiment, the input devices 511 can include selectable computer-generated display icons, and in other embodiments, the input devices 511 can include other arrangements, for example, pushbutton switches, cursor control devices and/or voice activation/recognition systems.

The altitude display 573 can be presented at the primary flight display 471 (FIG. 4) or another location. The altitude display 573 can include a current altitude indicator 574 and a preview indicator (or "bug") 576 highlighting a new altitude target associated with the instruction displayed at the communication display 510. The altitude display 573 can also include a preview display 575a which provides a preview of the new target altitude, and an active display 575b which presents the current target altitude. ATC instructions can be directed to the altitude display 573 and the mode control panel 420 without requiring the operator to re-input such information, as described below.

In operation, an incoming ATC instruction 527 is automatically received by the aircraft, for example, via an electronic data link or a voice recognition system that interprets voice instructions from ATC, or another arrangement. The instruction 527 can be automatically displayed at the communication display 510, where it is visually accessible to the operator. As shown in FIG. 5, the instruction can include a directive to climb to and maintain a 14,000 foot altitude. The operator can manipulate the input devices 511 positioned proximate to the communication display 510 to control how the instruction will be handled. For example, the operator can provide a receipt signal to the source of the ATC instruction by activating the accept input device 511a if the instruction is accepted, or a reject input device 511c if the instruction is rejected. Once the instruction has been accepted, the operator can activate the load input device 511b to direct a first input signal. In another embodiment, the first input signal can be directed when the operator activates the accept input device 511a, and the load input device 511b can be eliminated.

Upon receiving the first input signal, the system 100 directs the instruction to the appropriate system or subsystem at which it will be handled. For example, when the instruction includes an altitude directive, the instruction can be directed to both the altitude display 573 and the vertical control portion 525 of the mode control panel 420.

At the altitude display 573, the new altitude target (e.g., 14,000 feet) is highlighted by the preview indicator 576 and presented at the preview display 575a. At the mode control panel 420, this information can also be displayed at the preview display 522a while the active display 522b presents the altitude target to which the aircraft is currently being directed. When the operator provides a second input signal (e.g., via the transfer input device 521 on the mode control panel 420), the instruction provided in the preview displays 575a, 522a appears in the active displays 575b, 522b. In one aspect of this embodiment, the action of sending the second input signal not only updates the active displays 575b, 522b to include the new target, but also automatically implements the new target. For example, when the second input is received, the aircraft can automatically be directed to attain to the new target altitude, or the flight control system can automatically provide the operator with visual guidance cues for manually flying the aircraft to the new target altitude. In another embodiment, the operator provides at least one further input signal (e.g., a third input signal) before the new target will be implemented. This additional input signal can be provided via the same transfer input device 521 that provided the second input signal, or via another input device.

In one aspect of foregoing embodiments, the instruction 527 initially displayed at the communication display 510 can be subsequently provided at one or both of the altitude display 573 and the mode control panel 420 upon receiving at least one input signal from the operator, and without requiring the operator to regenerate or re-input this information. In still a further aspect of this embodiment, the instruction can relate not to generally strategic flight plan segments (which are presented at the flight plan list display 451 described above with reference to FIG. 4), but to tactical aspects of the control of the aircraft. These tactical control instructions may be implemented immediately (or nearly immediately) after being authorized by the operator. In other cases, the tactical instructions can be implemented later, for example, after a selected condition has been met. Further details of systems for handling conditional air traffic control instructions are disclosed in copending U.S. application Ser. No. 10/798,749, entitled "Systems and Methods for Handling Aircraft Information Received From an Off-Board Source," filed concurrently herewith and incorporated herein in its entirety by reference.

The system 100 can handle other instructions (in addition to, or in lieu of the altitude instructions described above) in a generally similar manner. For example, referring now to FIG. 6, an instruction 627 displayed at the communication display 510 can relate to the control of the aircraft speed (e.g., a directive to increase the speed of the aircraft to 320 knots). The operator can accept or reject the instruction 627 by activating the accept input device 511*a* or the reject input device 511*c*, and can load an accepted instruction by activating the load input device 511*b*. Once loaded, the instruction can be automatically directed to other portions of the overall system 100, for example, an airspeed indicator display 673 presented at the primary flight display 471 (FIG. 4), and the speed control portion 523 of the mode control panel 420. At the airspeed indicator display 673, a current airspeed indicator 674 and an active display 675*b* present the current airspeed target to which the aircraft is being controlled. A preview indicator 676 and a preview display 675*a* present the new target airspeed. At the mode control panel 420, an active display 622*b* presents the current target airspeed, a preview display 622*a* displays the new target, and a separator 626 visually separates the two displays. When the operator activates a transfer input device 621, the active displays 622*b* and 675*b* are updated to include the new target.

Figure 7:
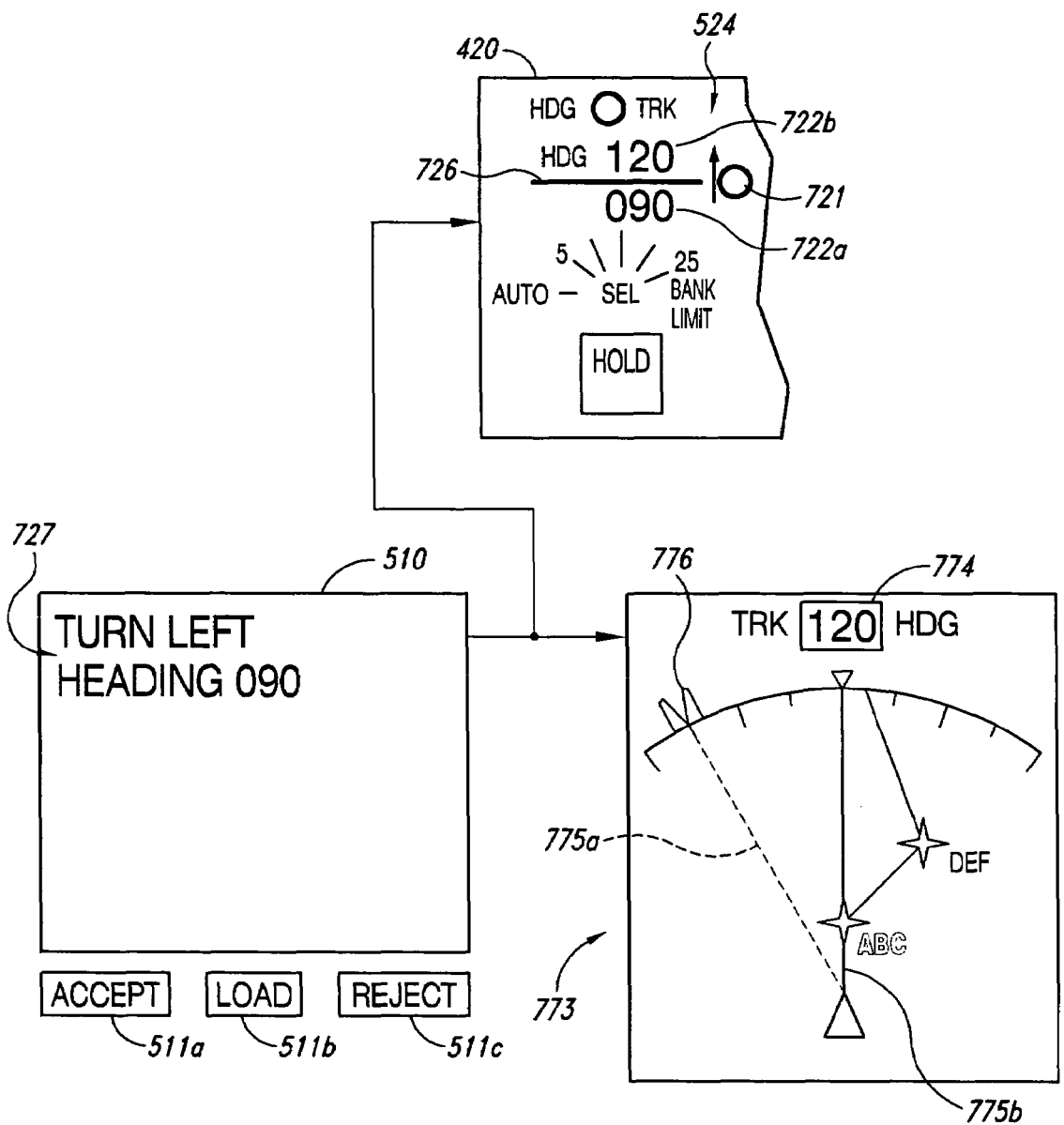
FIG. 7 is an illustration of portions of a system for handling aircraft lateral control information in accordance with an embodiment of the invention.

FIG. 7 illustrates a method and system for handling lateral motion control instructions, in accordance with another embodiment of the invention. The communication display 510 can present a lateral motion control instruction 727 that includes a new lateral target (e.g., "TURN LEFT HEADING 090"). Accordingly, the instruction can include the direction of the maneuver (e.g., left turn or right turn) as well as the target (e.g., 090). The instruction can also optionally indicate the basis for the target, e.g., whether the target is based on a magnetic bearing or a true bearing. The lateral motion control instruction 727 may also be issued and processed as a "heading" instruction (which does not account for drift-angle caused by winds aloft) or a "track" instruction (which does). When the operator activates the load input device 511*b*, the instruction can be directed to a direction display 773 (presented, for example, at the navigation display 472 shown in FIG. 4) and/or the lateral control portion 524 of the mode control panel 420, without being regenerated. At the direction display 773, an active course indicator 774 and an active course line 775*b* present the current lateral direction of the aircraft. A preview indicator 776 and a preview course line 775*a* identify the new target. The mode control panel 420 displays the current direction at an active display 722*b*, and the new target at a preview display 722*a* with a separator 726 positioned between the two. When the operator activates an input device 721, the active course line 775*b* and the active displays 772*b* and 774 are updated to reflect the new target information.

Figure 8:
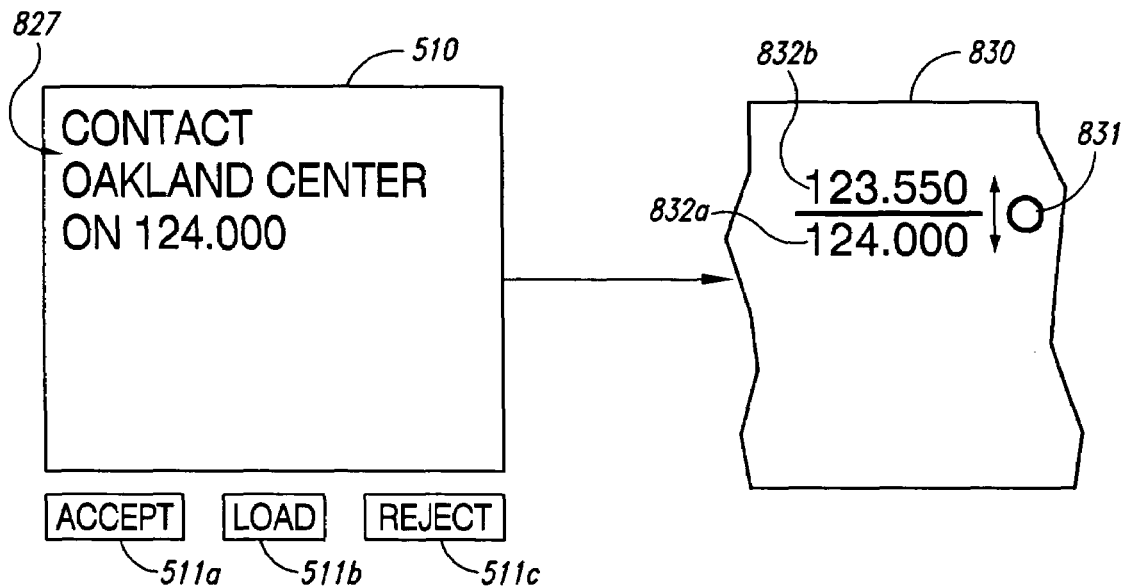
FIG. 8 is an illustration of portions of an aircraft system for handling radio frequency information in accordance with an embodiment of the invention.

In other embodiments, systems and methods generally similar to those described above can be used to automatically update displays and/or implement new target instructions regarding aspects of the aircraft's operation other than its heading, altitude and airspeed. For example, as shown in FIG. 8, the communication display 510 can present an ATC instruction 827 to tune the aircraft radio to a particular radio frequency (e.g., "CONTACT OAKLAND CENTER ON 124.000"). When the operator activates the load input device 511*b*, this instruction is automatically routed to a radio panel 830 and presented at a preview display 832*a*. When the operator activates a transfer input device 831 at the radio panel 830, the new target radio frequency is loaded into an active display 832*b*. As described above, the operator can optionally provide at least one further input signal before the new target is implemented, e.g., before the radio is automatically tuned to the new target frequency.

Figure 9:
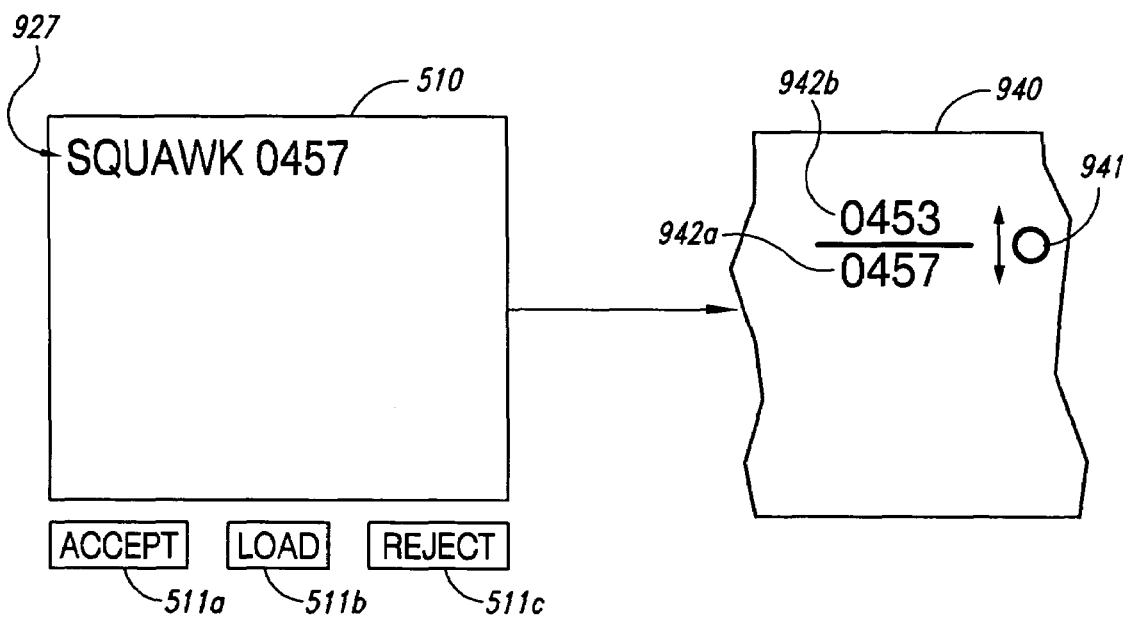
FIG. 9 is an illustration of portions of an aircraft system for handling aircraft transponder information in accordance with an embodiment of the invention.

Referring now to FIG. 9, the communication display 510 can present an automatically uplinked transponder instruction 927 (e.g., "SQUAWK 0457") which, when the operator activates the input device 511*b*, is automatically directed to a transponder panel 940. The instruction 927 is initially presented at a preview display 942*a* of the transponder panel 940 and then presented at an active display 942*b* when the operator activates a transfer input device 941. In one aspect of this embodiment, the new transponder frequency is automatically implemented upon activation of the transfer input device 941, and in other embodiments, the operator inputs an additional signal prior to implementation.

Figure 10:
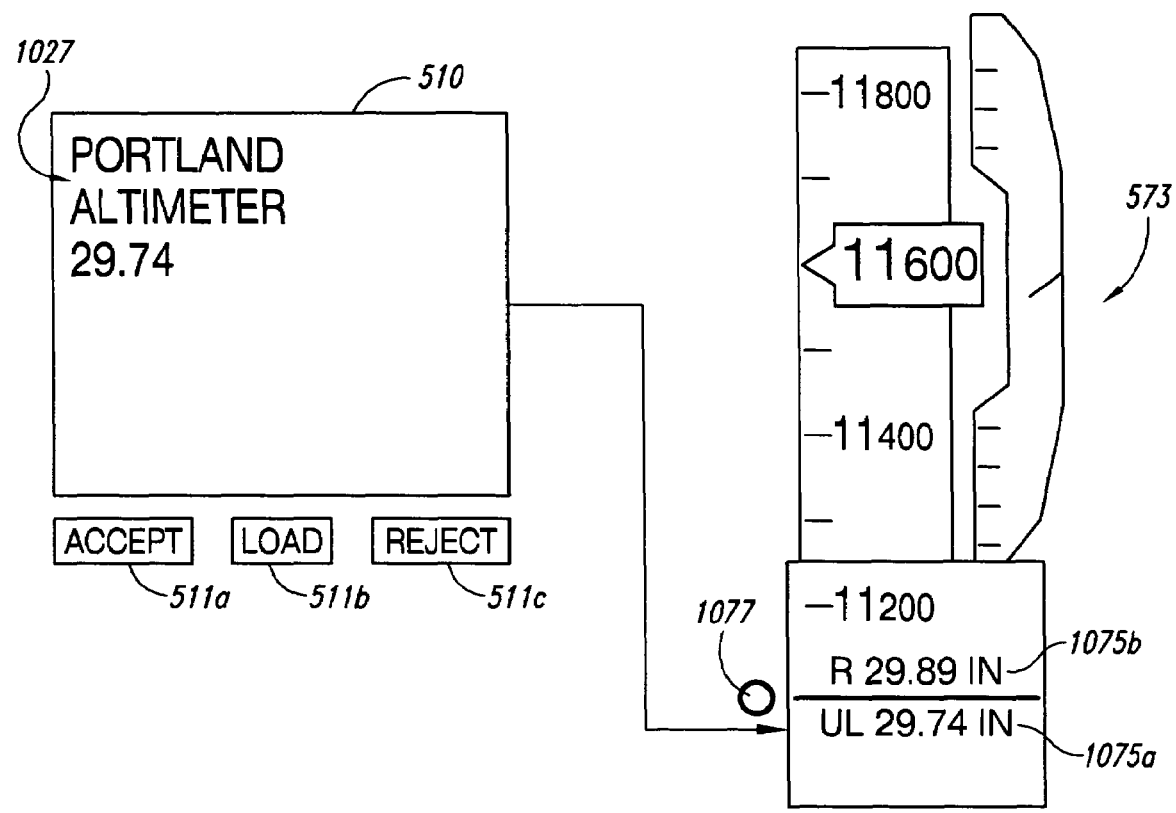
FIG. 10 is an illustration of portions of an aircraft system for handling aircraft altitude setting information in accordance with another embodiment of the invention.

As shown in FIG. 10, the communication display 510 can display an instruction 1027 that includes an altimeter setting to which the aircraft altimeters should currently be calibrated (e.g., "PORTLAND ALTIMETER 29.74"). This instruction can be directed to a preview display 1075*a* located proximate to the altitude display 573 described above with reference to FIG. 5. When the operator activates a transfer input device 1077, the instruction is transferred to an active display 1075*b*, indicating that the aircraft altimeters are now referenced to a new target altimeter setting. The transfer input device 1077 can be located proximate to the altitude display 573, as shown in FIG. 10, or at the EFISCPs 487 described above with reference to FIG. 4.

One feature of the foregoing embodiments described above with reference to FIGS. 2–10 is that instructions received automatically onboard the aircraft from an off-board source can be acted on by aircraft systems without the operator having to re-enter, regenerate or re-input the instructions. An advantage of this feature is that the time required by the operator to implement the instructions can be significantly reduced when compared to current methods that require the operator to re-input the instructions.

A further aspect of many of the foregoing embodiments is that, while the instructions received onboard the aircraft are acted upon without being regenerated, they are not acted upon without the involvement of the operator. For example, the operator can be responsible for acknowledging receipt of the instruction, loading the instruction (which will automatically be directed to the appropriate system or subsystem), transferring the instruction to active status after previewing it, and, optionally, authorizing implementation of the instruction after it has been placed on active status. An advantage of this arrangement is that the operator controls whether and when to load, activate and/or implement the instructions, without having to manually re-enter the instructions.

From the foregoing, it will be appreciated that specific embodiments of the invention have been described herein for purposes of illustration, but that various modifications may be made without deviating from the spirit and scope of the invention. For example, aspects of the invention described in the context of particular embodiments can be combined, re-arranged, and/or eliminated in other embodiments. Accordingly, the invention is not limited except as by the appended claims.

We claim:

1. A method for handling incoming aircraft operation instructions, comprising:
   receiving from a source off-board an aircraft an instruction for changing a characteristic of the aircraft;
   automatically displaying at least a portion of the instruction at a first display location of the aircraft;
   in response to receiving a first input signal directed by an operator onboard the aircraft, displaying at least a target portion of the instruction at a second display location without the instruction being manually regenerated onboard the aircraft and without the instruction becoming part of a flight plan list of automatically executed flight segments; and
   in response to receiving a second input signal directed by an operator onboard the aircraft, displaying at least a target portion of the instruction at a third display location without the instruction being manually regenerated onboard the aircraft.

2. The method of claim 1 wherein displaying at least a portion of the instruction at a first display location includes displaying at least a portion of the instruction at a communications display of the aircraft, and wherein displaying at least a target portion of the instruction at a second display location includes displaying at least a target portion of the instruction at a preview display of a mode control panel of the aircraft, and wherein displaying at least a target portion of the instruction at a third display location includes displaying at least a target portion at an active display of the mode control panel.

3. The method of claim 1, further comprising automatically implementing the instruction in response to receiving at least one further input signal from an operator of the aircraft.

4. The method of claim 1, further comprising implementing the instruction by changing a characteristic of the aircraft to achieve the target.

5. The method of claim 1 wherein receiving an instruction includes receiving the instruction via a data link.

6. The method of claim 1 wherein receiving an instruction includes receiving an instruction from air traffic control.

7. The method of claim 1 wherein the target portion of the instruction includes an identification of a target, and wherein the method further comprises implementing the instruction by automatically directing the aircraft to the target or providing guidance to the operator to direct the aircraft to the target.

8. The method of claim 1 wherein receiving an instruction includes receiving an instruction having at least one of a target altitude, a target speed and a target direction.

9. The method of claim 1 wherein receiving an instruction includes receiving an instruction having a lateral target and an indication of which direction the aircraft will turn to attain the lateral target.

10. The method of claim 1 wherein receiving an instruction includes receiving an instruction having a lateral target and an indication of whether the lateral target is a true bearing or a magnetic bearing.

11. The method of claim 1 wherein receiving an instruction includes receiving an instruction for at least one of a requested radio frequency setting, transponder frequency setting, and altimeter setting.

12. A method for handling incoming aircraft operation instructions, comprising:
   receiving via a data link an instruction for changing a flight behavior of an aircraft;
   in response to receiving a first input signal directed by an operator onboard the aircraft, displaying at least a target portion of the instruction at a preview display of an aircraft mode control panel without the instruction being manually regenerated onboard the aircraft, and without causing the instruction to become part of a flight plan list of automatically executed flight segments, the target portion identifying a target to which the aircraft can be directed; and
   upon receiving a second input signal directed by an operator onboard the aircraft, displaying at least a target portion of the instruction at an active target display of the aircraft mode control panel without the instruction being manually regenerated after being received on the aircraft.

13. The method of claim 12, further comprising automatically implementing the instruction by automatically directing the aircraft to the target.

14. The method of claim 12, further comprising automatically implementing the instruction by providing visually accessible guidance to an operator of the aircraft for controlling the aircraft to the target.

15. The method of claim 12, further comprising in response to receiving the first signal, transmitting an indication of receipt of the instruction to the source of the instruction.

16. An aircraft system including a computer-readable medium having contents that perform a method for handling incoming aircraft operation instructions, the method comprising:
   receiving from a source off-board an aircraft an instruction for changing a characteristic of the aircraft;
   automatically displaying at least a portion of the instruction at a first display location of the aircraft;
   in response to receiving a first input signal directed by an operator onboard the aircraft, displaying at least a target portion of the instruction at a second display location without the instruction being manually regenerated onboard the aircraft and without the instruction becoming part of a flight plan list of automatically executed flight segments; and
   in response to receiving a second input signal directed by an operator onboard the aircraft, displaying at least a target portion of the instruction at a third display location without the instruction being manually regenerated onboard the aircraft.

17. The system of claim 16, further comprising an aircraft carrying the computer-readable medium.

18. The system of claim 16, further comprising:
the first display location, and wherein the first display location includes a communications display of the aircraft;
the second display location, wherein the second display location includes a target display of a mode control panel of the aircraft; and
the third display location, wherein the third display location includes an active display of the mode control panel.

19. The system of claim 16 wherein the method performed by the computer-readable medium further comprises automatically implementing the instruction in response to receiving at least one further input signal from an operator of the aircraft.

20. The system of claim 16 wherein receiving an instruction includes receiving the instruction via a data link.

21. The system of claim 16 wherein the target portion of the instruction includes an identification of a target, and wherein the method further comprises implementing the instruction by automatically directing the aircraft to the target or providing guidance to the operator to direct the aircraft to the target.

22. The system of claim 16 wherein receiving an instruction includes receiving an instruction having at least one of a target altitude, a target speed and a target direction.

23. The system of claim 16 wherein receiving an instruction includes receiving an instruction having a lateral target and an indication of whether the lateral target is a true bearing or a magnetic bearing.

24. The system of claim 16 wherein receiving an instruction includes receiving an instruction for at least one of a requested radio frequency setting, transponder frequency setting, and altimeter setting.

25. An aircraft system including a computer-readable medium having contents that perform a method for handling incoming aircraft operation instructions, the method comprising:
receiving via a data link an instruction for changing a flight behavior of an aircraft;
in response to receiving a first input signal directed by an operator onboard the aircraft, displaying at least a target portion of the instruction at a preview display of an aircraft mode control panel without the instruction being manually regenerated onboard the aircraft, and without causing the instruction to become part of a flight plan list of automatically executed flight segments, the target portion identifying a target to which the aircraft can be directed; and
upon receiving a second input signal directed by an operator onboard the aircraft, displaying at least a target portion of the instruction at an active target display of the aircraft mode control panel without the instruction being manually regenerated after being received on the aircraft.

26. The system of claim 25, further comprising an aircraft carrying the computer-readable medium.

27. The system of claim 25, further comprising the mode control panel.

28. A system for handling incoming aircraft operation instructions, comprising:
means for receiving from a source off-board an aircraft an instruction for changing a characteristic of the aircraft;
first display means for automatically displaying at least a portion of the instruction at a first display location of the aircraft;
second display means for displaying at least a target portion of the instruction at a second display location in response to receiving a first input signal directed by an operator onboard the aircraft, without the instruction being manually regenerated onboard the aircraft and without the instruction becoming part of a flight plan list of automatically executed flight segments; and
third display means for displaying at least a target portion of the instruction at a third display location in response to receiving a second input signal directed by an operator onboard the aircraft, without the instruction being manually regenerated onboard the aircraft.

29. The system of claim 28, further comprising the aircraft.

30. The system of claim 28 wherein the first display means are configured to automatically display at least a portion of the instruction at a communication display of the aircraft, and wherein the system further comprises the communication display.

31. The system of claim 28 wherein the second display means are configured to display at least a target portion of the instruction at a preview display of an aircraft mode control panel, and wherein the system further comprises the mode control panel.

32. The system of claim 28 wherein the third display means are configured to display at least a target portion of the instruction at an active display of an aircraft mode control panel, and wherein the system further comprises the mode control panel.

33. An aircraft system for handling incoming aircraft operation instructions, comprising:
a receiver configured to receive from a source off-board an aircraft an instruction for changing a characteristic of the aircraft;
a communication display coupled to the receiver to display at least a portion of the instruction; and
a mode control panel having a preview display configured to display at least a target portion of the instruction in response to a first input signal directed by an operator onboard the aircraft, without the instruction being manually regenerated onboard the aircraft and without the instruction becoming part of a flight plan list of automatically executed flight segments, the mode control panel further having an active display configured to display at least a target portion of the instruction in response to a second input signal directed by an operator onboard the aircraft, without the instruction being manually regenerated onboard the aircraft.

34. The system of claim 33, further comprising an aircraft housing the receiver, the communication display and the mode control panel.

35. The system of claim 33, further comprising:
a first input device operatively coupled to the preview display to receive the first input signal; and
a second input device operatively coupled to the active display to receive the second input signal.

36. The system of claim 33, further comprising:
a first input device operatively positioned proximate to the communication display and operatively coupled to the preview display to receive the first input signal; and
a second input device housed by the mode control panel and operatively coupled to the active display to receive the second input signal.

* * * * *

UNITED STATES PATENT AND TRADEMARK OFFICE
CERTIFICATE OF CORRECTION

PATENT NO.       : 7,363,119 B2                                              Page 1 of 1
APPLICATION NO.  : 10/798588
DATED            : April 22, 2008
INVENTOR(S)      : Griffin, III et al.

It is certified that error appears in the above-identified patent and that said Letters Patent is hereby corrected as shown below:

On page 3, in field (56), under "Other Publications", in column 1, line 5, delete "Opininoo" and insert -- Opinion --, therefor.

Signed and Sealed this

Second Day of September, 2008

JON W. DUDAS
*Director of the United States Patent and Trademark Office*